United States Patent Office 3,579,468
Patented May 18, 1971

---

3,579,468
PROCESS FOR RECONSTITUTING NATURAL CITRONELLA OIL
Robert P. T. Young, Ponte Vedra, Fla., assignor to SCM Corporation, New York, N.Y.
No Drawing. Filed Aug. 26, 1966, Ser. No. 575,238
Int. Cl. C11b *9/00, 9/02*
U.S. Cl. 252—522                     1 Claim

ABSTRACT OF THE DISCLOSURE

Reconstituted citronella oil in which at least a portion of the naturally occurring d-citronellal in the natural oil is replaced by substantially equivalent weight proportion of dl-citronellal is described. The reconstituted citronella oil has substantially the same odor value as that of the natural citronella oil. Processes for preparing this product are also described. The invention is advantageous in that it provides d-citronellal which would not otherwise be available and which is useful in making hydroxy citronellal, a perfumery chemical and is also advantageous in that it extends the supply of citronella oil.

---

This invention relates to a reconstituted natural citronella oil and process therefore.

Natural citronella oil is a commodity originating in Formosa and other remote places. It contains approximately equal weight proportions of geraniol, citronellol and d-citronellal, the latter being optically active. Natural citronella oil is used for its odor value in perfumes, and the d-citronellal fraction is useful in making hydroxy citronellal, also a perfumery chemical.

The instant invention is based on discovery that replacement of part or all of the naturally-occurring d-citronellal in citronella oil by an optically inactive (dl) citronellal does not materially affect the odor value of the natural citronella oil or hydroxy citronellal made therefrom.

Thus, the reconstituted natural citronella oil of this invention is one in which at least a portion of the naturally-occurring d-citronellal is replaced by a substantially equivalent weight proportion of dl (racemic) citronellal.

This substitution of the racemic for the optically active citronellal is quite unexpected because the optical isomers of terpene chemicals usually have quite distinctive organoleptic properties far apart from each other. For example l-menthol has a minty flavor and also a pronounced cooling sensation, whereas the d-menthol isomer lacks entirely or virtually entirely any of said cooling sensation; l- and d- citronellal are markedly different in their odor qualities; l-carvone is present and significant in the spearmint flavor whereas d-carvone is suggestive of caraway and dill, and is an important constituent in those oils.

The reconstitution of natural citronella oil can be done most simply by fractionally distilling (topping) d-citronellal from the remainder of the citronella oil distilland under reduced pressure, e.g., 10–20 mm. Hg abs., and replacing it with a substantially equaivalent proportion of dl-citronellal. The latter product can be made by disproportionating and purifying a mixture of geraniol and nerol, which in turn can be synthesized from myrcene. The following example shows how the invention can be practiced, but is not to be construed as limiting the invention.

EXAMPLE

Natural Formosan citronella oil is charged into a kettle equipped with an efficient fractional distillation column, condenser, reflux return, and other appurtenances to fractionally distill at a pressure of 10 mm. Hg abs. Virtually all the naturally-occurring d-citronellal is topped off by fractional distillation. The distilland is cooled, and a proportion of dl-citronellal (racemic) of the same weight as the d-citronellal distillate is blended into the distilland. The optically inactive material added does not occur in nature, but is a synthetic product. Samples of the resulting reconstituted natural citronella oil are subjected to organoleptic evaluation for odor value in perfumes and odorants by a panel expert in these arts. They rate the product equivalent to the natural citronella oil which was thus reconstituted. Additionally, when dl-citronellal is fractionated from the reconstituted oil and converted into hydroxy citronellal, the panel detects no appreciable difference between the hydroxy citronellal so made and that made from the d-citronellal fraction of the same natural citronella oil.

I claim:
1. A process for reconstituting natural citronella oil without detracting materially from its odor value, which comprises separating virtually all of the naturally occurring di-citronellal from said oil and replacing said d-citronellal with synthetic dl-citronellal.

References Cited

Guenther: The Essential Oils, vol. IV, 1950, D. Van Nostrand, N.Y., 1950, pp. 65–68, 76–82, 99–100, 103, 110–115, 118–119.

Simonsen: The Terpenes, vol. 1, Cambridge University Press, 1931, pp. 59–69.

Chem. Abs., vol. 32, 1938, pp. 6398–6399.

ALBERT T. MEYERS, Primary Examiner
A. P. FAGELSON, Assistant Examiner

U.S. Cl. X.R.
260—236.6